(12) United States Patent
Smit et al.

(10) Patent No.: US 6,393,589 B1
(45) Date of Patent: May 21, 2002

(54) WATCHDOG TIMER CONTROL CIRCUIT WITH PERMANENT AND PROGRAMMABLE ENABLEMENT

(75) Inventors: Willem Smit; Johannes Albertus Van Niekerk, both of Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 09/154,015

(22) Filed: Sep. 16, 1998

(51) Int. Cl.[7] .................... H02H 3/05; H03K 19/003
(52) U.S. Cl. ................ 714/55; 714/33; 714/23; 714/34
(58) Field of Search .................. 714/55, 33, 23, 714/34; 713/323, 321, 340

(56) References Cited

U.S. PATENT DOCUMENTS

| | | | |
|---|---|---|---|
| 5,175,845 A | 12/1992 | Little ..................... | 713/323 |
| 5,218,705 A | 6/1993 | DeLuca et al. ........... | 713/321 |
| 5,233,613 A | * 8/1993 | Allen et al. ............. | 714/55 |
| 5,528,756 A | * 6/1996 | Molnar .................. | 714/55 |
| 5,909,394 A | * 6/1999 | Chou ..................... | 365/185.21 |
| 6,145,103 A | * 11/2000 | Typaldos et al. ......... | 714/55 |

FOREIGN PATENT DOCUMENTS

EP        0 335 494        10/1989      G06F/11/00

OTHER PUBLICATIONS

"Unattended System Monitor," IBM Technical Disclosure Bulletin, U.S., IBM Corp., New York; vol. 33, No. 3A; pp. 453–457, Aug. 1, 1990.

\* cited by examiner

*Primary Examiner*—Robert Beausoleil
*Assistant Examiner*—Tim Vo
(74) *Attorney, Agent, or Firm*—Baker Botts L.L.P.

(57) ABSTRACT

A new control circuit for a watchdog timer which is incorporated on the same integrated circuit as a microprocessor or microcontroller. The control circuit permits either permanent or software enablement or disablement of the watchdog timer depending on the operating mode of the microprocessor.

1 Claim, 1 Drawing Sheet

WATCHDOG TIMER CONTROL CIRCUIT WITH PERMANENT AND PROGRAMMABLE ENABLEMENT

BACKGROUND OF THE INVENTION

1. Field of the Invention

This invention relates generally to microprocessors and microcontrollers. Specifically, the present invention relates to watchdog timers which may be found as auxiliary components as either physically integral or separate from the microprocessor or microcontroller. If physically separate, the watchdog timer may be a stand alone component or integrated into a device which contains the watchdog timer as one of several auxiliary functions related to the operation of the microprocessor or microcontroller.

2. Description of the Prior Art

The current state of the art describes watchdog timers which are used to prevent lock-up of the software executed by the computer system. Lock-up of the software may occur for a variety or reasons such as software defects, power surges, eletro-magnetic interference, etc. The watchdog timer serves to interrupt or reset the computer system after a predetermined time has elapsed unless commanded not to do so by the system. Thus, if the computer system is operating correctly, the watchdog time will be continuously restarted prior to the predetermined elapsed time and will not reset the microprocessor. However, if the computer system fails to operate properly, the watchdog timer will expire causing a reset to be sent to the microprocessor.

In computer systems where the microprocessor enters a sleep mode or a hibernation mode as a result of inactivity for example, the function performed by the watchdog timer may not be required. In cases such as this, an external event, such as renewed activity, will cause the microprocessor to exit the sleep mode and restart normal operation. Thus, in systems where power conservation is imperative, such as battery operated systems, turning off non-essential functions such as a watchdog timer during sleep mode will serve to conserve battery power.

In many conventional computer systems, the control or selection of the watchdog timer function is performed by a mask option during fabrication or a hardware fuse such as an Eletrically Programmble Read Only Memory (EPROM) bit. The drawback to these designs is that once enabled, the watchdog timer cannot be disabled during modes when its function is not required by the system.

U.S. Pat. No. 5,175,845 (Little) discloses an integrated circuit with watchdog timer and sleep control logic which places the integrated circuit and watchdog timer into sleep mode. However, there are several technological distinctions between the Little reference and the present invention. These differences include the incorporation of the watchdog timer on an auxiliary integrated circuit other than the microprocessor, the need to ground the "IN" pin to permanently disable the watchdog timer (which also disables the non maskable interrupt) and disabling the watchdog timer by leaving the strobe input "ST" open. Thus, the Little reference lacks the flexibility of a watchdog timer, integral with the microcontroller, with firmware and software selectability.

Therefore, a need existed to provide watchdog timer which may be implemented on the same integrated circuit as the microcontroller with firmware and software selection logic.

SUMMARY OF THE INVENTION

It is an object of the present invention to provide a watchdog timer on the same integrated circuit as the microprocessor or microcontroller.

It is another object of the present invention to provide a watchdog timer which may be enabled or disabled by a fuse such as an EPROM device.

It is another object of the present invention to provide a watchdog timer which may be enabled or disabled by software control over a register.

It is another object of the present invention to provide a master control for the enablement or disablement of the watchdog timer.

In accordance with one embodiment of the present invention, a watchdog timer control circuit is comprised of a permanent enablement logic, software controllable logic, selection logic and a watchdog timer.

The foregoing and other objects, features, and advantages of the invention will be apparent from the following, more particular, description of the preferred embodiment of the invention, as illustrated in the accompanying drawings.

DETAILED DESCRIPTION OF THE PREFERRED EMBODIMENT

Figure 1:
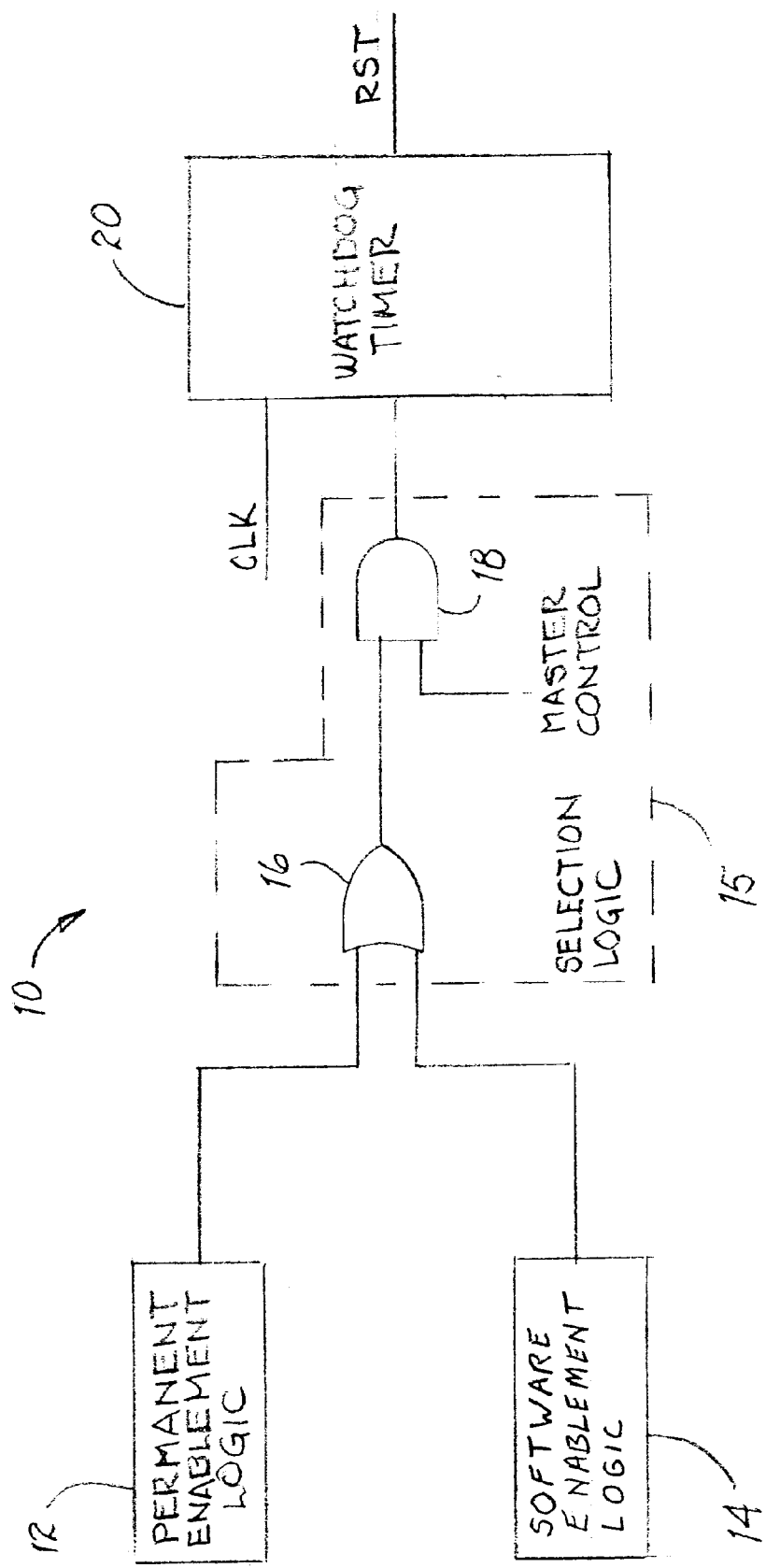
FIG. 1 is block diagram of the present invention.

Referring to FIG. 1, a watchdog timer control circuit 10 (hereinafter "circuit") is shown. The circuit 10 is comprised of permanent enablement logic 12, software controllable logic 14, selection logic 15 and a watchdog timer 20.

In the preferred embodiment, the permanent enablement logic 12 is comprised of non-volatile memory such as Read Only Memory (ROM), Programmable Read Only Memory (PROM), Electrically Programmable Read Only Memory (EPROM), Electrically Erasable Programmable Read Only Memory (EEPROM) or FLASH memory. The permanent enablement logic 12 is typically a function of the firmware which is embedded in the device and designed to be permanent in nature, but may be altered in certain situations.

The software enablement logic 14 is comprised of a register and is typically read and written to by the microprocessor. The microprocessor may access the register directly or via a multifunction bus. Thus, the microprocessor may clear or set the register as a function of the operating mode in which it is about to enter or exit.

In the preferred embodiment the selection logic 15 is comprised of an OR gate 16 and a AND gate 18. If either the permanent enablement logic 12 or the software enablement logic 14 is set the output of the OR gate 16 will also be set. The AND gate 18 provides for a master control of the enablement of the watchdog timer 20. The master control may be asserted by the microprocessor itself or by another external means.

Although the invention has been particularly shown and described with reference to a preferred embodiment thereof, it will be understood by those skilled in the art that changes in form and detail may be made therein without departing from the spirit and scope of the invention.

What is claimed is:

1. A method of controlling a watchdog time comprising the steps of:

setting a hardware fuse to enable or disable operation of a watchdog timer;

setting a software controllable register to enable or disable operation of the watchdog timer;

ORing the contents of the hardware fuse and the software controllable register;

ANDing the result of the ORing step with a master control; and providing the result of the ANDing step to the watchdog timer.

* * * * *